No. 635,975. Patented Oct. 31, 1899.
R. H. POST.
SELF CLEANSING FILTER.
(Application filed July 15, 1898.)
(No Model.)
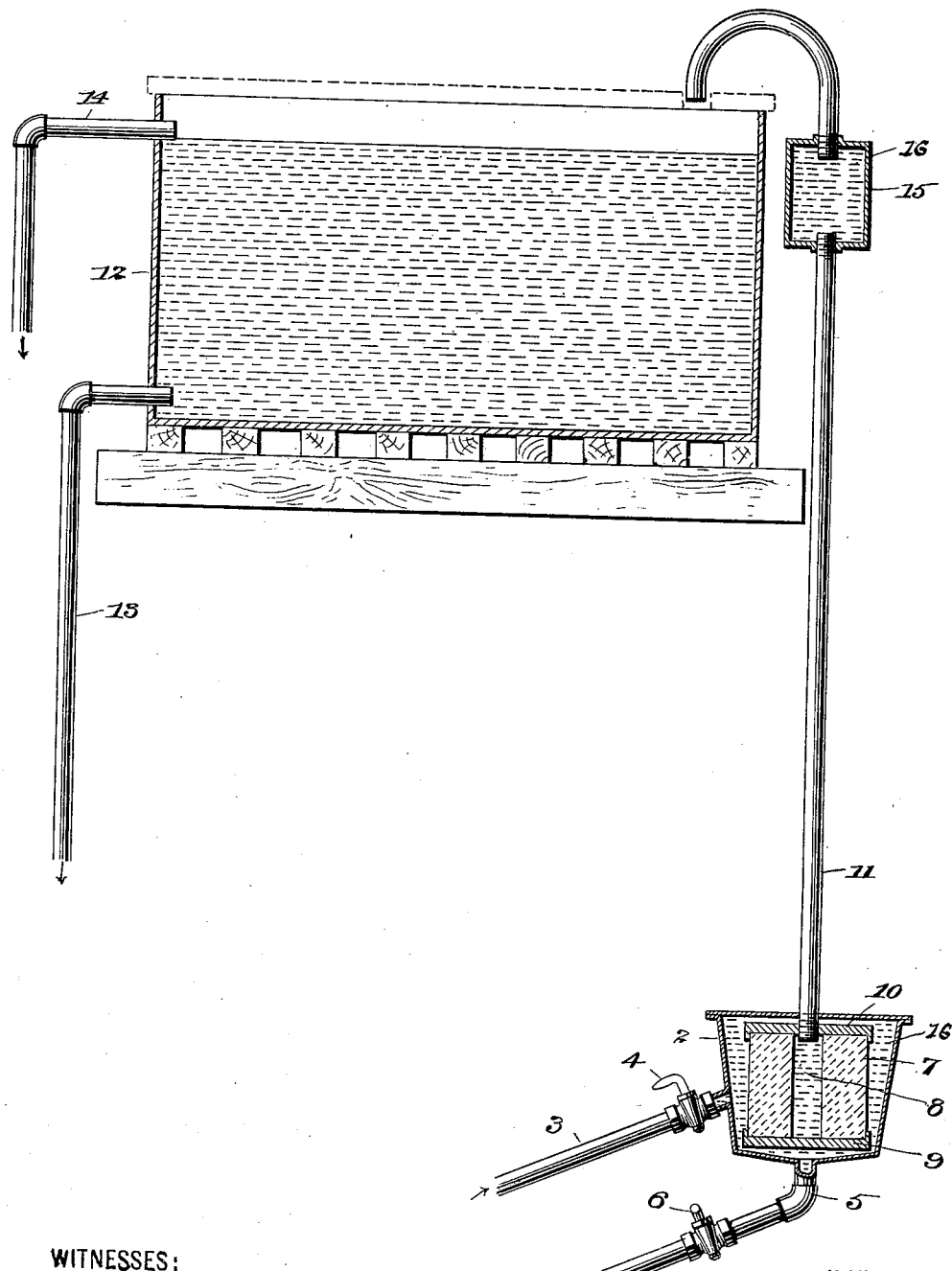
WITNESSES:
Frank S. Ober
A. M. Hayes
INVENTOR
Regis H. Post,
BY
Fowler & Fowler
ATTORNEYS.
THE NORRIS PETERS CO., PHOTO-LITHO., WASHINGTON, D. C.

UNITED STATES PATENT OFFICE.

REGIS H. POST, OF BAYPORT, NEW YORK.

SELF-CLEANSING FILTER.

SPECIFICATION forming part of Letters Patent No. 635,975, dated October 31, 1899.

Application filed July 15, 1898. Serial No. 686,026. (No model.)

*To all whom it may concern:*

Be it known that I, REGIS H. POST, a citizen of the United States, residing at Bayport, Suffolk county, New York, have invented certain new and useful Improvements in Self-Cleansing Filters, of which the following is such a full, clear, and exact description as will enable any one skilled in the art to which it appertains to make and use the same, reference being had to the accompanying drawing, forming part of this specification.

My invention relates to a self-cleansing filter in which a current of filtered water is passed through the filtering medium in the opposite direction to which the water is originally passed through the medium in filtering it.

The principal object of the invention is to utilize the weight of a column or body of filtered water to give the necessary pressure or head to the reverse current in order to cleanse the filtering medium; and to this end the invention consists in the various novel and peculiar arrangements and combinations of the various parts of the apparatus, all as herein fully set forth and then pointed out in the claims.

I have illustrated a type of my invention in the accompanying drawing, wherein I show a side view of my improved filter discharging into a reservoir which is provided with a main or tap pipe and an overflow-pipe, the filtering-compartment and the filtering medium being shown in vertical section, likewise the pressure-chamber and the stand-pipe and the reservoir into which the stand-pipe discharges.

Referring to the accompanying drawing, 2 is a closed compartment of suitable shape, into which leads a supply-pipe 3, having a hand-valve 4 for opening and closing it, and 5 is a drain-pipe which extends from the bottom of the compartment and which is provided with a hand-valve 6 for controlling the opening thereof.

7 is the filtering medium located within the compartment 2, and consists of suitable ordinary filtering material, and this body is formed with a hollow center 8, and it is preferably circular in cross-section, though it may be of any shape desired. This hollow cylinder or block 7 has its lower end provided with a plate or cap 9, that is impervious to water, and its upper end is likewise provided with a similar plate 10, and 11 is the stand-pipe which passes down through the top of the compartment 2, thence through the top plate 10 of the filtering medium, so as to communicate with the interior 8 thereof. The stand-pipe 11 leads upwardly to a suitable point, where it empties into a reservoir 12, though it is disconnected therefrom, so that its upper end is in free communication with the outer air. The reservoir, which may be used as house-supply, if desired, is provided with a main discharge-pipe 13, and 14 is an overflow-pipe for the reservoir to prevent flooding. The upper end of the stand-pipe is bent over to one side, so as to discharge the filtered water into the reservoir, and I prefer to provide this pipe with an enlargement or pressure-chamber 15 for increasing the head on the water in the stand-pipe.

In order to obtain filtered water which may be directly drawn off from the end of the stand-pipe or emptied in the reservoir 12 for subsequent use, as preferred, the valve 6 in the drain-pipe is closed and the supply-pipe valve 4 is opened. Under this condition the water 16 fills the compartment 2 and by the pressure from the main is forced through the filtering-cylinder from the exterior thereof into the center 8, whence it passes upwardly through the stand-pipe 11 and is discharged therefrom. When it is desired to cleanse the filter, the valve 4 in the supply-pipe 3 is closed and the valve 6 of the drain-pipe is opened, whereupon the column of water which fills the stand-pipe and the pressure-chamber 15 passes down by its own weight into the center of the filtering-cylinder, whence it is forced outwardly by its own weight in a reverse direction to the exterior walls of the filter, thereby cleansing the same. The water which has thus been used to cleanse or rinse the filter passes from the bottom of the compartment 2 out of the drain-pipe to a sewer connection or other suitable point.

The great height of the filtered-water stand-pipe 11 gives to the water standing in the filtered-water compartment 8 a head or pressure about as great as that of the water supply or main, but in a reverse direction, so that the filtered matter or impurities which are forced into the filter medium 7 by the pressure of the supply are readily dislodged and washed out from the filter medium by the reverse pressure afforded by the stand-pipe.

It will be understood that my idea of utilizing the weight of the column of water for giving a head to the reverse current in cleansing the filter may be employed with other forms of filters than the one shown, and I do not limit myself to such specific embodiment of the invention. The filter may of course be used with a reservoir, as shown, or without such part.

Having thus described my invention, what I claim, and desire to secure by Letters Patent, is—

1. A self-cleansing filter consisting in the combination of a closed impure-water compartment 2, provided with supply-pipe 3, and a drain-pipe 5 each having a valve for controlling the same, a tubular filter medium 7, provided with a closed compartment 8 and located within the said compartment 2, an ordinary pipe 11 open at its upper end communicating with the closed compartment 8 of the filter medium and extending upwardly a sufficient distance to impart to the water in said compartment 8 pressure slightly less than that of the supply, whereby the shutting off of the supply-pipe and opening of the drain-pipe will cause filtered water to pass through the filter medium in the reverse direction to cleanse the same, substantially as and for the purpose set forth.

2. A self-cleansing filter consisting in the combination of a closed impure-water compartment 2, provided with a supply-pipe 3 and a drain-pipe 5 each having a valve for controlling the same, a tubular filter medium 7, provided with a closed compartment 8 and located within the said compartment 2, an ordinary open pipe 11, communicating with the closed compartment 8 of the filter medium and extending upwardly a sufficient distance to impart to the water in said compartment 8 pressure slightly less than that of the supply, a reservoir provided with a service-pipe and into which said stand-pipe 11 discharges, whereby the shutting off of the supply-pipe and opening of the drain-pipe will cause filtered water to pass through the filter medium in the reverse direction to cleanse the same, substantially as and for the purpose set forth.

3. A self-cleansing filter consisting in the combination of a closed impure-water compartment 2, provided with a supply-pipe 3, and a drain-pipe 5 each having a valve for controlling the same, a tubular filter medium 7, provided with a closed compartment 8 located within the said compartment 2, an ordinary open pipe 11 communicating with the closed compartment 8 of the filter medium and extending upwardly a sufficient distance to impart to the water in said compartment 8 pressure slightly less than that of the supply, a reservoir provided with a service-pipe and into which the said stand-pipe discharges said stand-pipe being provided with a pressure-chamber 15, whereby the shutting off of the supply-pipe and opening of the drain-pipe will cause filtered water to pass through the filter medium in the reverse direction to cleanse the same, substantially as and for the purpose set forth.

4. A self-cleansing filter consisting in the combination of a filter medium, a filtered-water compartment, an ordinary stand-pipe open at its upper end and communicating at its lower end with the said filtered-water compartment and extending upwardly a sufficient distance to impart to the water in the filtered-water compartment a pressure somewhat less than that of the supply, a valve for normally retaining the filtered water in said stand-pipe and the opening of which valve permits the water in said stand-pipe to pass by its own pressure through the filter medium in the reverse direction to cleanse the filter medium, substantially as and for the purpose set forth.

In testimony whereof I have hereunto set my hand, this 14th day of July, 1898, in presence of the two subscribing witnesses.

REGIS H. POST.

Witnesses:
A. M. HAYES,
WILLIS FOWLER.